United States Patent Office 3,500,190
Patented Mar. 10, 1970

3,500,190
VEHICLE VELOCITY MEASURING SYSTEM EMPLOYING ADJUSTABLE WIDTH PULSE GENERATING SYSTEM
Gerald J. Michon, Waterford, N.Y., assignor to General Electric Company, a corporation of New York
Filed June 23, 1967, Ser. No. 648,494
Int. Cl. G01p 3/56
U.S. Cl. 324—69            9 Claims

ABSTRACT OF THE DISCLOSURE

Signals from each of the pair of tachometers coupled to vehicle axles are used to trigger separate adjustable pulse generators to provide a pair of adjustable width output pulses. A precision width pulse generator is triggered by the trailing edge of the adjustable width pulse generated in response to the tachometer having the highest output frequency. A gating circuit responds to the triggered adjustable width pulse and to a precision width pulse to provide a highly accurate output signal having an adjustable pulse width. As a result, the pulse width of a series of output signals can retain a prescribed relationship to the velocity of a vehicle in spite of vehicle wheel wear.

BACKGROUND OF THE INVENTION

This invention relates to velocity measuring systems, and more particularly, it relates to systems of this type which require a highly accurate measurement of the velocity of an element.

While this invention may be adapted for use in any velocity measuring system where a continuously adjustable and yet highly accurate pulse width output signal is desired in response to an input signal, it is particularly useful in systems where alternating-current tachometers are used to precisely measure the velocity of a vehicle. For example, in automatic rapid transit control systems, where vehicles are run with a short headway and accurate stopping control is required in station and terminal areas, the velocity of the vehicles must be precisely controlled. In systems of this type, the frequency of alternating-current tachometers coupled to vehicle axles is used to measure the number of rotations made by a vehicle wheel. When the diameter of the wheels is known, the number of tachometer output signals generated during any unit of time can be used to measure the velocity of the train.

However, the diameters of supposedly identical train wheels, even on the same vehicle, are very seldom exactly the same. Thus, where a standardized tachometer can be installed with any one of a number of train wheels, the proportionality between the tachometer output frequency and the train velocity varies with any differences in the diameter of the train wheels. Furthermore, once a tachometer is connected to any single wheel, factors such as wheel wear may vary the original ratio between train velocity and the tachometer output frequency. Thus, it is difficult to obtain a precise measurement of the train velocity through the use of a standardized alternating-current tachometer.

Therefore, it is an object of this invention to provide a system which can convert alternating-current tachometer signals to output signals which can be adjusted to have a precise relationship to the velocity of a controlled vehicle.

It is another object of this invention to provide a vehicle velocity measuring system which can be conveniently corrected for variations which occur in vehicle wheel diameters, while providing signals which are a precise measurement of the velocity of a vehicle.

Rapid transit systems must comply with fail-safe requirements imposed upon most passenger-carrying common carriers. That is, if a portion of the control system of a rapid transit train fails while the train is in motion, the failure should cause the train to slow down and stop, rather than to accelerate.

It is therefore an object of this invention to provide a fail-safe circuit for converting tachometer output signals to signals which can be adjusted to provide a precise measurement of vehicle velocity.

SHORT SUMMARY OF INVENTION

Briefly stated, and in accordance with one aspect of this invention, the voltage level of the time integral of a series of output pulses can be made proportional to the actual velocity of a vehicle by providing for the development of highly accurate, adjustable width output pulses. The pulse width of each output pulse equals the sum of the pulse widths of a pair of pulses comprising a precision width pulse and an adjustable width pulse generated in response to each input signal.

The width of the output pulse may be changed by adjusting the width of the adjustable pulse to compensate for factors, such as differences in vehicle wheel diameters, which may vary the ratio between the vehicle velocity and the frequency of a tachometer signal used as input signals.

In one preferred embodiment of this invention the relationship between the pulse width of the precision pulse and the adjustable pulse must be such that any errors in the pulse width of the adjustable pulse do not appreciably affect the overall pulse width of the output pulse. Thus, the pulse width of the precision pulse may be substantially greater than the pulse width of the adjustable pulse, such as 10 times greater. The combination of this precision pulse generator and the adjustable pulse generator facilitates the generation of output pulses having a pulse width which is adjustable in small amounts without hindering the accuracy of the pulse width of the final output pulses.

To provide for fail-safe operation of the velocity measuring system, each of a pair of tachometers is coupled to an axle of the vehicle. The output signals from these tachometers are compared and the tachometer signals indicating the highest vehicle velocity for any one actual velocity are used as a true indication of the velocity.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings in which:

FIG. 3 is a schematic diagram of a frequency-to-analog converter of the type which may be used in accordance with this invention.

SPECIFICATION

Figure 1:
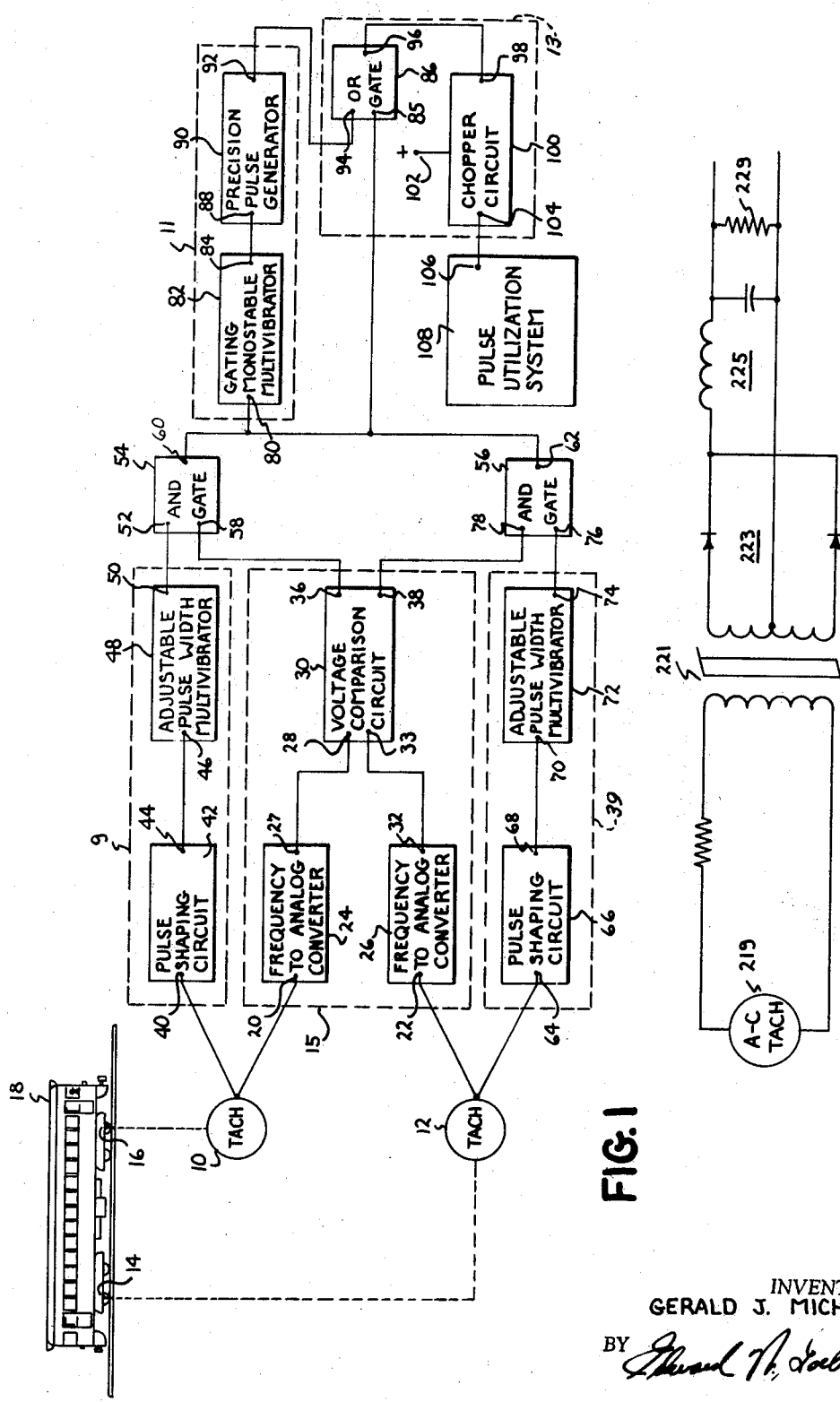
FIG. 1 is a block diagram of a fail-safe system which provides an output signal having a prescribed relationship to the velocity of a vehicle.

As the illustrated embodiment of this invention shown in FIG. 1, an output pulse generator can provide a highly accurate measurement of the velocity of a vehicle by using the voltage level of the time integral of a series of pulses as measurement of the velocity. Tachometers 10 and 12 are mechanically coupled to the axles of wheels 14 and 16 respectively, of a controlled vehicle 18. The tachometers 10 and 12 may be of the alternating-current type, the frequency of which changes with variations in the rate of axle rotation and thus with changes in the velocity of the vehicle. For example, the tachometers may be calibrated to generate three output cycles per second for each mile per hour of the vehicle velocity when coupled to the axle of a wheel of some standard diameter. Thus, when the vehicle is travelling at 30 miles per hour, the tachometer output frequency is 90 hertz. Should the wheel diameter be larger than this standard, an output frequency of 90 hertz is generated at a higher velocity. If the diameter is smaller than standard, a frequency of 90 hertz is generated at a lower velocity.

To provide for accurate measurement of the velocity, an output signal from one of these tachometers, such as 10, can cause a pair of pulse generating means 9 and 11 to provide a sequentially generated pair of pulses. For example, generating means 9 provides and adjustable width pulse, while generating means 11 provides a precision width pulse which is substantially unaffected by variations in ambient temperature, or changes in the magnitude of the supply voltage or control signals. In the illustrated embodiment the trailing edge of each adjustable width pulse from generating means 9 can initiate the generation of the precision width pulse from generating means 11. However, relative positions of the generating means 9 and 11 may be reversed without deviating from the invention.

The pulses from the generating means 9 and 11 are added together by means 13 to provide a highly accurate, adjustable width output pulse. One important aspect of this invention is that the relationship between the widths of the adjustable and precision pulses must ensure that any inaccuracies in the generation of the adjustable pulse do not apreciably affect the overall pulse width of the output pulse. That is, should inaccuracies occur in the adjustable width pulses, they must not cause more than the maximum percentage of error allowable in the output pulse. Thus, the generating means 9 and 11 and the means 13 are combined to provide the highly accurate output pulses, each having a pulse width which may be adjusted by small amounts. When the height of these pulses is maintained at a constant voltage level, the voltage level of the time integral of a series of output pulses can be kept proportional to the velocity of a vehicle by adjusting the pulse width of each output pulse as the relationship between the frequency of the tachometer 10 and the actual velocity of the vehicle 18 changes. For example, if the vehicle wheels wear so that they are smaller than a selected standard diameter, a higher frequency tachometer signal is generated for any given speed. The adjustable pulse width should be decreased accordingly to maintain a prescribed relationship between the pulse width (and thus the area under constant voltage pulses) of a series of output pulses and the vehicle velocity.

In accordance with another aspect of this invention, means 15 is provided for comparing the frequency of the tachometers 10 and 12 to determine which of them is measuring the higher speed for any one actual speed of the vehicle 18. The tachometer measuring the higher speed is used as a true indication of the speed, and variable width pulses generated in response to it are coupled to generating means 11 and means 13. Signals from each of the tachometers 10 and 12 are coupled to input terminals 20 and 22, respectively, to separate frequency-to-analog converters 24 and 26. The converters 24 and 26 change the output signals to analog voltages which vary in magnitude with the frequency of the signals.

The analog voltages from the converters 24 and 26 are compared to find which of the tachometers 10 and 12 indicates the higher speed. Output terminal 27 of the converter 24 is coupled to an input terminal 28 of direct current comparison circuit 30. An output terminal 32 of the converter 26 is coupled to a second input terminal 33 of the comparison circuit 30. An output is always present at one of the output terminals 36 and 38 of the comparison circuit 30, corresponding to the input terminals 28 and 33, respectively. When, for example, the output signal is present at the terminal 36, and the voltage at the input terminal 33 becomes a preselected amount greater than that at the input terminal 28, the output signal switches to the output terminal 38 of the circuit 30. The voltage comparison circuit 30 thus has a dead band of voltage differences to which it does not respond, thereby preventing circuit hunting. By comparing the voltage levels at the terminals 28 and 33, and providing a signal at the appropriate output terminal, the voltage comparison circuit 30 indicates which of the tachometers 10 and 12 measures the higher velocity of the vehicle 18. As will be more fully explained below, output signals from the adjustable pulse generating means associated with this tachometer are used in generating the final output signal of the velocity measuring system.

The voltage comparison circuit 30 may contain a time delay circuit which prevents the comparison circuit 30 from responding to mere transient voltage differences at the input terminals 28 and 33.

Output signals from the tachometer 12 are coupled through a separate variable pulse generating circuit 39 which, preferably, is identical to the circuit 9. In the present embodiment of this invention, each of the circuits 9 and 39 generates an adjustable width pulse during each half-cycle of the tachometer output signal coupled thereto. Using the tachometer 10 once again as an example, output signals therefrom are coupled to an input terminal 40 of a pulse shaping circuit 42. This circuit is of the type which generates a rectangular pulse each time the tachometer output signal crosses its zero axis, midway between the upper and lower limits of the tachometer output signal. That is, both the positive going wave and the negative going wave of the tachometer signal are operative to initiate an output from the pulse shaping circuit 42. However, the pulse shaping circuit 42 may be any circuit which provides output signals each time the pulse generating means 9 is to generate an adjustable width pulse in response to a signal from the tachometer 10.

To provide the adjustable pulses, signals are coupled from an output terminal 44 of the circuit 42 and to an input terminal 46 of an adjustable pulse width signal generator comprising a monostable multivibrator 48. This multivibrator may be one of the well known types having an ability to provide a pulse having a width which can be conveniently adjusted. A circuit of this type is shown in figure 13.62 and described on pages 300–346 of the General Electric Transistor Manual, 7th edition, which is incorporated herein by reference. The multivibrator 48 should be compensated to as great an extent as is practically possible to minimize pulse width changes caused by varying ambient temperature conditions, changes in power supply voltage levels, etc.

The generating means 39 comprises a circuit similar to generating means 9 for converting signals from the tachometer 12 to adjustable width output pulses. Signals from the tachometer 12 are coupled to an input terminal 64 of a pulse shaping circuit 66 which can be identical with the circuit 44. An output terminal 68 of the circuit 66 is coupled to an input terminal 70 of an adjustable pulse width generating circuit 72 which may comprise a multivibrator similar to the multivibrator 48 and having an output terminal 74.

Means are provided for coupling adjustable width pulses generated in response to the higher velocity tachometer to the precision generating means 11 and pulse adding means 13. Thus, pulses from an output terminal 50 of multivibrator 48 are coupled to an input terminal 52 of a coincidence circuit such as AND gate 54. This AND gate, in combination with an AND gate 56, transmits the adjustable width pulses from one of the generating means 9 and 39 and blocks the signals from the other.

To allow the comparison circuit 30 to trigger and appropriate AND gate, the terminal 36 of this circuit is coupled to an input terminal 58 of the AND gate 54, and the terminal 38 is coupled to an input terminal 78 of the AND gate 56. The coincidence of signals at the terminals 52 and 58 provide an adjustable width pulse from the multivibrator 48 at an output terminal 60 of the AND gate 54. Similarly, the coincidence of signals at input terminals 76 and 78 allow adjustable width pulses from the multivibrator 72 to be present at an output terminal 62 of the AND gate 56.

Adjustable width pulses from either the terminal 60 of the AND gate 54 or the terminal 62 of the AND gate 56 are coupled to an input terminal 80 of a gating monostable multivibrator 82 and to an input terminal 85 of an OR gate 86. This OR gate immediately responds to the adjustable width pulse. The gating multivibrator 82 is of the type which responds to the trailing edge of each adjustable pulse to provide an output signal at its output terminal 84, which in turn is coupled to an input terminal 88 of a precision pulse generator 90 connected thereto.

The precision pulse generator 90 may be any type of generator which produces a pulse having a precisely determined time duration in response to an input signal. The time duration of this pulse should be unaffected by changes in its ambient temperature, supply voltage level, or the magnitude of its input signals from the multivibrator 82. A precision pulse generator of this type is described in a patent application entitled "Precision Timing Pulse Generator," filed in the names of Gerald J. Michon and Jerry L. Stratton on Oct. 24, 1966, Ser. No. 588,980, and assigned to the assignee of the present invention.

The OR gate 86 is included in the means 13 for adding the adjustable width pulse to the precision width pulse. An output terminal 92 of the precision generator 90 is connected to an input terminal 94 of the OR gate 86 to couple the precision width pulse to the OR gate.

The pulse width of many precision pulse generators having characteristics of the type specified above can normally only be varied with relatively large step-like changes. For example, in the above-cited application, the precision pulse width is measured by an integral number of cycles of a signal generated by a resonant circuit. Changes in the pulse width are most conveniently made by changing the number of integral cycles comprising a pulse.

In accordance with this invention, a highly accurate pulse having a pulse width adjustable by small amounts is provided by controlling the relative pulse widths of the precision and variable pulses, while knowing the maximum possible percentage of error in the generation of each pulse and the maximum tolerable percentage of error in a final output pulse. The pulse width of the adjustable width pulse should have a relationship to that of the precision width pulse such that errors in the generation of the adjustable width pulse do not affect the final output pulse beyond the maximum tolerable percentage of error.

Means are provided for allowing the adding circuit means 13 to provide pulses having substantially constant pulse heights and pulse widths for each adjustment of the adjustable multivibrator 48. The output terminal 96 is connected to an input terminal 98 of a chopper circuit 100. A regulated voltage supply, not shown, having a constant level output voltage is connected to a terminal 102 of the chopper circuit 100. This chopper circuit normally has no output signal at its output terminal 104. However, when it receives signals from the OR gate 86, it provides "constant area" output pulses having a pulse width equal to that of the composite output pulse of the OR gate 86 and a voltage level equal to the regulated voltage level at the terminal 102. The frequency at which the "constant area" pulses are developed at the terminal 104 varies with changes in the rate of rotation of the axles of the vehicle 18. Thus, the voltage level of the time integral of the output pulses is proportional to the actual velocity of the vehicle 18.

The velocity measuring output pulses from the chopper circuit 100 are coupled to an input terminal 106 of a pulse utilization system 108. One advantage of the velocity measuring system described in conjunction with the illustrated embodiment of this invention is that it can be adapted for use as a portion of an automatic tractive effort control system for rapid transit and other railway vehicles. The "constant area" pulses from the chopper circuit 100 are a type of pulses found to be desirable in such systems.

OPERATION OF FIG. 1

Figure 2:
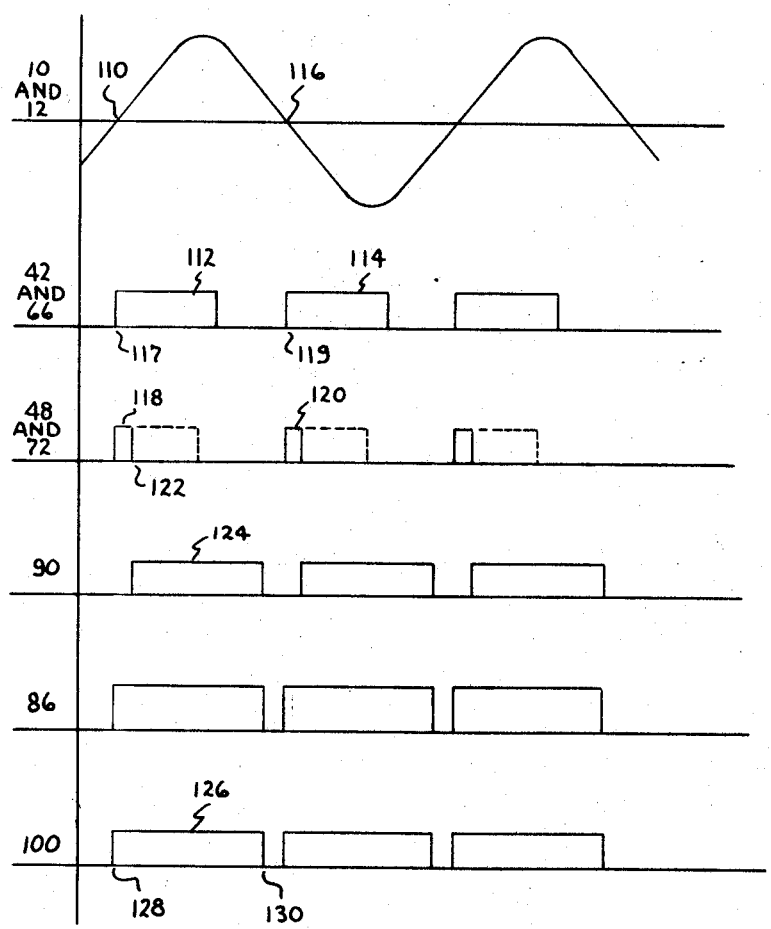
FIG. 2 is a diagram showing wave forms of signals available from identified portions of the system shown in FIG. 1.

FIG. 2 should be referred to, along with FIG. 1, for an explanation of the system shown in FIG. 1. Each series of voltage waves in FIG. 2 is marked with a numeral corresponding to the portion of the FIG. 1 system which produces the voltage waves.

The rotation of the axles of the vehicle 18 cause the tachometers 10 and 12 to generate output signals. The frequency-to-analog converters 24 and 26 develop output signals having a magnitude proportional to the frequency of their respective tachometers. The analog signals from these converters are compared by the circuit 30, with the largest of the analog signals enabling one of the AND gates 54 and 56.

Alternating-current type signals from the tachometers 10 and 12 actuate the multivibrators 48 and 72 to produce adjustable width pulses from the generating means 9 and 39, respectively. Referring to FIG. 2, when a positive going tachometer signal crosses the zero axis at a point 110, a pulse 112 is generated by an appropriate pulse shaping circuit 42 or 66. Similarly, a pulse 114 is generated as the negative going tachometer signal crosses the zero axis at a point 116.

The initial edge of each of the pulses from the pulse shaping circuits 42 and 66 triggers the adjustable pulse width multivibrators 48 and 72. For example, an initial edge 117 of the pulse 112 causes an output pulse 118 to be generated, while an intial edge 119 of the pulse 114 causes a pulse 120 to be generated.

The dotted line addition to the pulses 118 and 120 represents the fact that the width of these pulses may be adjusted to change the relationship between the velocity of the vehicle 18 and the width of the final output pulses, should a need for such a change ensue with wheel wear or for some other reason.

Assuming that the signal comparison means 15 has enabled the AND gate 54, adjustable width pulses from the multivibrator 48 are coupled to the OR gate 86 and to the gating multivibrator 82. At this time there is no output from the precision generating means 11. The OR gate 86 now passes an adjustable width pulse, for example, the pulse 118 FIG. 2, to the chopper circuit 100.

The precision pulse generator 90 is turned on when the gating multivibrator 82 receives a trailing edge 122 of the pulse 118. Thus, immediately after the end of the pulse 118, the precision pulse generator 90 provides a precision width pulse 124 to the OR gate 86, the total pulse width of the output pulse at the terminal 96 equalling the sum of the pulse widths of the adjustable pulse 118 and the precision pulse 124.

The chopper circuit 100, upon receipt of the output pulse, generates its own output pulse having a constant voltage magnitude, a leading edge 128 which coincides with the leading edge of the adjustable pulse 118 and a trailing edge 130 which conicides with the trailing edge of the precision pulse 124. The frequency of the "constant area" pulses, such as 126, varies with changes in the rate of rotation of the axies of the train 18. When the tachometers 10 and 12 are originally installed in a vehicle, the multivibrators 48 and 72 should be adjusted so that a preselected relationship exists between the actual vehicle velocity and the voltage level of the time integral of the pulses from the chopper circuit 100. It may be that the diameter of the wheel connected to the axle 14 differs from that of the wheel connected to the axle 16. In this instance, when the tachometers 10 and 12 are originally installed in the vehicle, the multivibrators 48 and 72 each must provide a different width output pulse to maintain the preselected relationship between the vehicle velocity and the total area under the chopper circuit pulses. The multivibrators 48 and 72 should be adjusted from time to time to compensate for any changes in wheel diameter caused, for example, by wheel wear occurring after the original installation of the teachometers.

As an example of how the relative pulse width of the precision pulse generator 90 and the adjustable pulse generators 48 and 72 can be calculated, assume that the maximum allowable error in the composite output pulse of the OR gate 86 is 2%. Assume also that the adjustable pulse generator is accurate to within plus or minus 5% of any preseltced pulse width and the precision pulse generator is accurate to within plus or minus ½ of 1% of a preselected pulse width. If the precision pulse width is around 10 times greater than the maximum adjustable pulse width, any error in the generation of the composite pulse is within the allowable 2% of error. The pulse width of the precision pulse is thus substantially larger than that of the adjustable pulse so that the accuracies in the generation of the adjustable pulse do not appreciably affect pulse width of the composite output pulse from OR gate 86.

One preferred type of frequency-to-analog converter, comprising the converters 24 and 26, is shown in FIG. 3. A tachometer 219 is coupled through a saturable transformer 221 to a full wave rectifier 223. The output signals from the rectifier 223 are then transferred through an L-C filter 225 and across a resistance 229. The saturable transformer 221 is selected to saturate at some time during each half-cycle of the signal from the tachometer 219, providing an output pulse having a fixed volt-second area. The rectified, fixed area pulse has an average voltage level which varies with the frequency of the tachometer.

This invention is not limited to the particular details of the preferred embodiment illustrated. It is contemplated that various modifications and applications of the priciples of this invention may be made within the scope of this invention by those skilled in the art.

What I claim as new and desire to secure by Letters Patent of the United States is:

1. A vehicle velocity measuring system wherein a train of output pulses having a repetition rate responsive to the angular velocity of a vehicle wheel are time integrated to produce a signal having an amplitude indicative of vehicle velocity, comprising in combination:
    (a) Means responsive to the angular velocity of a vehicle wheel for producing signals having a repetition rate proportional to said angular velocity;
    (b) First pulse generating means responsive to said signals to generate a train of first square wave pulses having a repetition rate proportional to said angular velocity;
    (c) Second pulse generating means responsive to said first train of square wave pulses to generate a train of second square wave pulses having a repetition rate proportional to said angular velocity, each of said second square wave pulses commencing in time correspondence to the termination of a corresponding one of said first square wave pulses;
    (d) The square wave pulses generated by one of said pulse generating means being fixed width pulses and the square wave pulses generated by the other one of said pulse generating means being adjustable width pulses;
    (e) Means coupled to said first and second pulse generating means for producing output pulses of a fixed amplitude and having a pulse width equal to the sum of the width of one of the fixed pulses and one of the adjustable width pulses, so that the output pulse train has a repetition rate proportional to the angular velocity of the vehicle wheel and has a pulse width adjustable within the range of adjustment of said adjustable width pulses.

2. A vehicle velocity measuring system according to claim 1 in which the fixed width pulse width is substantially greater than the adjustable width pulse width.

3. A vehicle velocity measuring system accordingly to claim 1 including means for establishing the time integral of the output pulse train to measure the vehicle velocity.

4. In a vehicle velocity measuring system wherein a train of output pulses having a repetition rate responsive to the angular velocity of a vehicle wheel is time integrated to produce a signal having an amplitude indicative of vehicle velocity, an arrangement for generating said train of output pulses comprising:
    (a) Tachometer means adapted to be coupled to a wheel of the vehicle for generating alternating-current signals having a frequency proportional to the rate of rotation of the vehicle wheel;
    (b) First means coupled to said tachometer for generating adjustable width pulses in response to the alternating-current signals;
    (c) Precision generating means coupled to said first means for providing precision width pulses in response to each of the adjustable width pulses, the precision width pulses and the adjustable width pulses having relative pulse widths such that inaccuracies in the pulse width of the adjustable pulses do not appreciably affect the overall pulse width of the output pulses from the vehicle velocity measuring system; and
    (d) Gating circuit means coupled to the output of said first means and to the output of said precision pulse generator to provide highly accurate output pulses having a pulse width equal to the sum of the widths of the variable pulse and the precision pulse.

5. A system according to claim 4 wherein the pulse width of the precision pulse is substantially greater than that of the adjustable pulse so that any errors which occur in the pulse width of the adjustable pulses do not appreciably affect the pulse width of the gating output pulses.

6. A system according to claim 5 wherein the pulse width of a precision pulse is approximately ten times larger than the pulse width of an adjustable pulse.

7. A system according to claim 4 wherein said first means comprises monostable multivibrator means which generate the adjustable pulses and said precision generator responds to the trailing edge of each of the adjustable pulses.

8. The system according to claim 4 including:
    (a) Second tachometer means adapted to be connected to a second wheel of the vehicle for generating second alternating-current type signals having a frequency proportional to the rate of the second wheel's rotation;
    (b) Second means coupled to said second tachometer means for generating second adjustable width pulses in response to the second alternating-current signals, means for coupling the second adjustable width pulses to said precision pulse generator and to said gating circuit means;
    (c) Frequency responsive means coupled to said first and second tachometers for comparing the frequencies of the first and second alternating-current signals; and
    (d) Means responding to said frequency-responsive means for coupling adjustable width pulses from the one of said first and second variable pulse generating means which generates pulses at the higher frequency thereby providing fail-safe operation of said velocity measuring system.

9. For use in a tractive effort control system of a rapid transit vehicle, a vehicle velocity measuring system wherein alternating-current type signals from a tachometer coupled to a vehicle axle are converted to highly accurate output pulses adapted to be time integrated to produce a signal having an amplitude indicative of vehicle velocity, comprising, in combination:

(a) First generator means for generating adjustable width pulses;

(b) Second generator means for generating precision pulse width pulses, the width of the precision pulses being greater than that of the adjustable width pulses so that errors which occur in the generation of the adjustable pulses do not appreciably affect the output pulses of the velocity measuring system;

(c) Means for coupling one of said generator means to said tachometer to cause said one of said generator means to generate a first pulse;

(d) Means for coupling the other said generator means to said one of said generator means so that the other of said generator means generates a second pulse in response to the trailing edge of the first pulse; and (e) Means coupled to the output of said first and second generator means for adding the pulse widths of the first and second pulses so as to provide output pulses having a width equal to the sum of the widths of the adjustable width pulse and the precision width pulse.

References Cited

UNITED STATES PATENTS

| | | | |
|---|---|---|---|
| 3,175,152 | 3/1965 | Shafer | 324—70 |
| 3,210,630 | 10/1965 | Zelina | 318—52 |
| 3,274,443 | 9/1966 | Eggenberger | 317—5 |
| 3,335,349 | 8/1967 | Cooper | 318—326 |
| 3,346,771 | 10/1967 | Sutton | 317—5 |

RUDOLPH V. ROLINEC, Primary Examiner

M. J. LYNCH, Assistant Examiner

U.S. Cl. X.R.

317—5; 318—326; 324—70, 78